Figures 1, 2, 3:
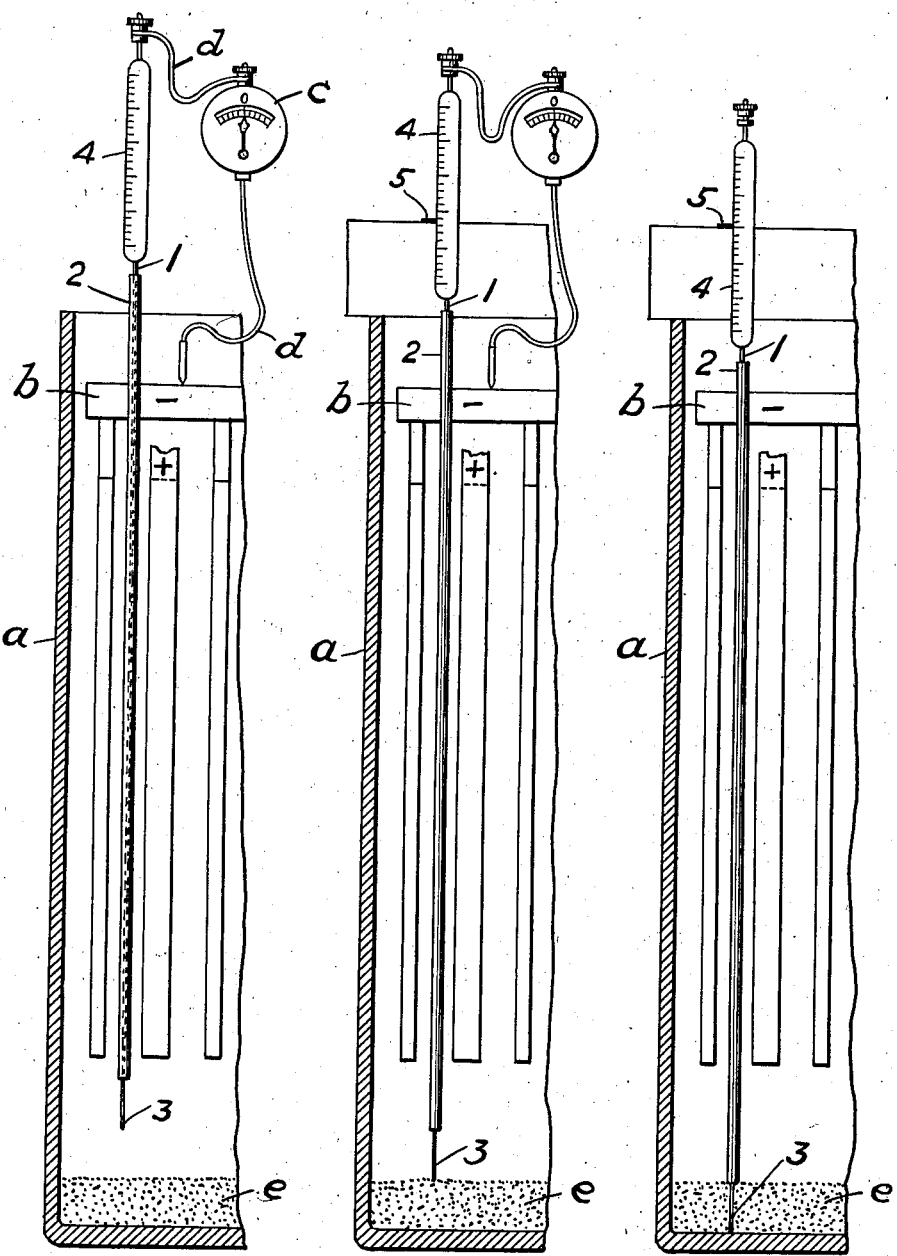

Dec. 12, 1939.　　　　　M. RABL　　　　　2,183,492

STORAGE BATTERY SEDIMENT MEASURING DEVICE

Filed March 28, 1939

INVENTOR

May Rabl

BY Augustus B. Stoughton

ATTORNEYS.

WITNESS:

Patented Dec. 12, 1939

2,183,492

UNITED STATES PATENT OFFICE 2,183,492

STORAGE BATTERY SEDIMENT MEASURING DEVICE

Max Rabl, Vienna, Germany, assignor to The Electric Storage Battery Company, Philadelphia, Pa., a corporation of New Jersey Application March 28, 1939, Serial No. 264,515
In Germany March 29, 1938

2 Claims. (Cl. 175—183)

Hitherto the determination of the depth of sediments in electric storage battery cells, especially those of opaque material, was usually accomplished by the complete dismantling of the electrode or plate assembly.

The principal objects of the present invention are to provide a simple and convenient device for determining or measuring the depth of sediment in electric storage battery cells, especially those of opaque material, and to provide for doing this, without disturbing or dismantling the electrode assembly, and with certainty and accuracy.

Other objects of the invention will appear from the following description at the end of which the invention will be claimed.

Generally stated, the invention consists of a rod covered with insulating material, included in circuit with a volt meter or the like, adapted to be inserted into the electrolyte between parts of the plate structure and having an index and scale and a projecting point adapted by polarization to oppose flow of current when spaced from the sediment and to permit flow of current when the point touches the sediment.

The invention also comprises the improvements to be presently described and finally claimed.

In the following description reference will be made to the accompanying drawing forming part hereof and in which, Figure 1 is a somewhat diagrammatic and schematic view illustrating features of the invention; and Figures 2 and 3 are similar views illustrating different positions of the parts.

In the drawing, 1 generally indicates a rod which may be made of nickel wire. The rod 1 is provided with an insulating cover 2 as of "Mipolam" which, however, exposes a small metal point 3 at its lower end. There is provided a scale 4 and index 5. This rod or electrode 1 is adapted for insertion into the electrolyte of a storage battery cell or jar $a$ and between parts of the plate structure $b$ thereof. The rod in series with a volt meter $c$ or like instrument, is in a circuit $d$. As shown, the plate structure $b$ immersed in the electrolyte constitutes a source of potential tending to cause a flow of current through the voltmeter C, the rod 1, the point 3 and thence through the electrolyte back to the plate structure $b$. However, due to the extremely small contact surface of the point 3 exposed to the electrolyte, a very small flow of current, hardly perceptible on the voltmeter, will cause sufficient polarization of this contact surface to oppose any further flow of current; but when the point 3 touches the sediment, the latter acts as a conducting and depolarizing material, permitting a considerable flow of current and a quick and pronounced indication on the voltmeter. The operator then knows that the point of the rod is in contact with the upper surface of the sediment $e$. The operator notes this position on the scale, for example, as shown in Figure 2, and he then continues to depress the rod until the point 3 touches the bottom of the cell or container, as in Figure 3. Reference to the scale then indicates the depth of the sediment in the bottom of the cell or container.

It will be obvious to those skilled in the art that modifications may be made in details of construction and arrangement and in matters of mere form without departing from the spirit of the invention which is not limited to such matters or otherwise than the prior art and the appended claims may require.

I claim:

1. A device for determining the depth of sediment in a storage battery cell or container comprising a covered metal rod adapted for depression through the electrolyte to the bottom of the cell and having an exposed point of restricted area adapted to be polarized when inserted in the electrolyte of the battery, in combination with a circuit in which is interposed the rod, and an electrical instrument also interposed in the circuit, the construction and arrangement being such that the difference in potential across the instrument is slight when the point is polarized and is suddenly increased upon contact of the point with the sediment.

2. The combination substantially as described in claim 1 and in which the rod is provided with an index and scale.

MAX RABL.